(12) United States Patent
Gasser

(10) Patent No.: US 12,252,101 B2
(45) Date of Patent: Mar. 18, 2025

(54) HYDROPNEUMATIC VALVE HAVING A MECHATRONIC MODULE

(71) Applicant: BEKA, Saint-Aubin S.A., St-Aubin-Sauges (CH)

(72) Inventor: Olivier Gasser, Veytaux (CH)

(73) Assignee: BEKA, Saint-Aubin S.A., St-Aubin-Sauges (CH)

( * ) Notice: Subject to any disclaimer, the term of this patent is extended or adjusted under 35 U.S.C. 154(b) by 779 days.

(21) Appl. No.: 17/436,016

(22) PCT Filed: Mar. 4, 2020

(86) PCT No.: PCT/IB2020/051860
§ 371 (c)(1),
(2) Date: Sep. 2, 2021

(87) PCT Pub. No.: WO2020/178761
PCT Pub. Date: Sep. 10, 2020

(65) Prior Publication Data
US 2022/0169224 A1 Jun. 2, 2022

(30) Foreign Application Priority Data

Mar. 7, 2019 (CH) .................................... 00277/19

(51) Int. Cl.
*B60T 13/68* (2006.01)
*B60T 7/20* (2006.01)
(Continued)

(52) U.S. Cl.
CPC .............. *B60T 13/683* (2013.01); *B60T 7/20* (2013.01); *B60T 8/1701* (2013.01); *B60T 13/581* (2013.01); *B60T 13/686* (2013.01); *B60T 15/027* (2013.01); *B60T 15/028* (2013.01); *F16K 31/04* (2013.01); *F16K 31/1225* (2013.01); *F16K 31/1221* (2013.01)

(58) Field of Classification Search
CPC .... B60T 13/683; B60T 13/581; B60T 13/686; B60T 7/20; B60T 8/1701; B60T 8/1708; B60T 15/027; B60T 15/028; F16K 31/04; F16K 31/1225; F16K 31/1221
USPC ................................................. 303/22.7, 123
See application file for complete search history.

(56) References Cited

U.S. PATENT DOCUMENTS 3,712,340 A * 1/1973 Deem ................... B60T 13/581
303/29
3,779,612 A 12/1973 Tschannen
(Continued)

FOREIGN PATENT DOCUMENTS

DE 102014018632 A1 6/2016
DE 202018001859 U1 4/2018
(Continued)

OTHER PUBLICATIONS

International Search Report and Written Opinion for PCT/IB2020/051860, dated Sep. 30, 2020, 2 pgs.

*Primary Examiner* — Xuan Lan Nguyen
(74) *Attorney, Agent, or Firm* — Blank Rome LLP

(57) ABSTRACT

The invention relates to a hydropneumatic valve for a vehicle train, comprising a hydraulic module, a pneumatic module and a mechatronic module, wherein the mechatronic module allows the pneumatic module to be activated independently of the hydraulic module.

10 Claims, 6 Drawing Sheets

(51) Int. Cl.
*B60T 8/17* (2006.01)
*B60T 13/58* (2006.01)
*B60T 15/02* (2006.01)
*F16K 31/04* (2006.01)
*F16K 31/122* (2006.01)

(56) References Cited

U.S. PATENT DOCUMENTS 3,790,807 A * 2/1974 Rossigno ............... B60T 13/58
                                                            188/112 A
2009/0206651 A1* 8/2009 Wright ................ B60T 13/665
                                                            303/22.2

FOREIGN PATENT DOCUMENTS

| EP | 0832803 A1 | 4/1998 |
| EP | 2165901 A1 | 3/2010 |
| EP | 2305524 A1 | 4/2011 |

* cited by examiner

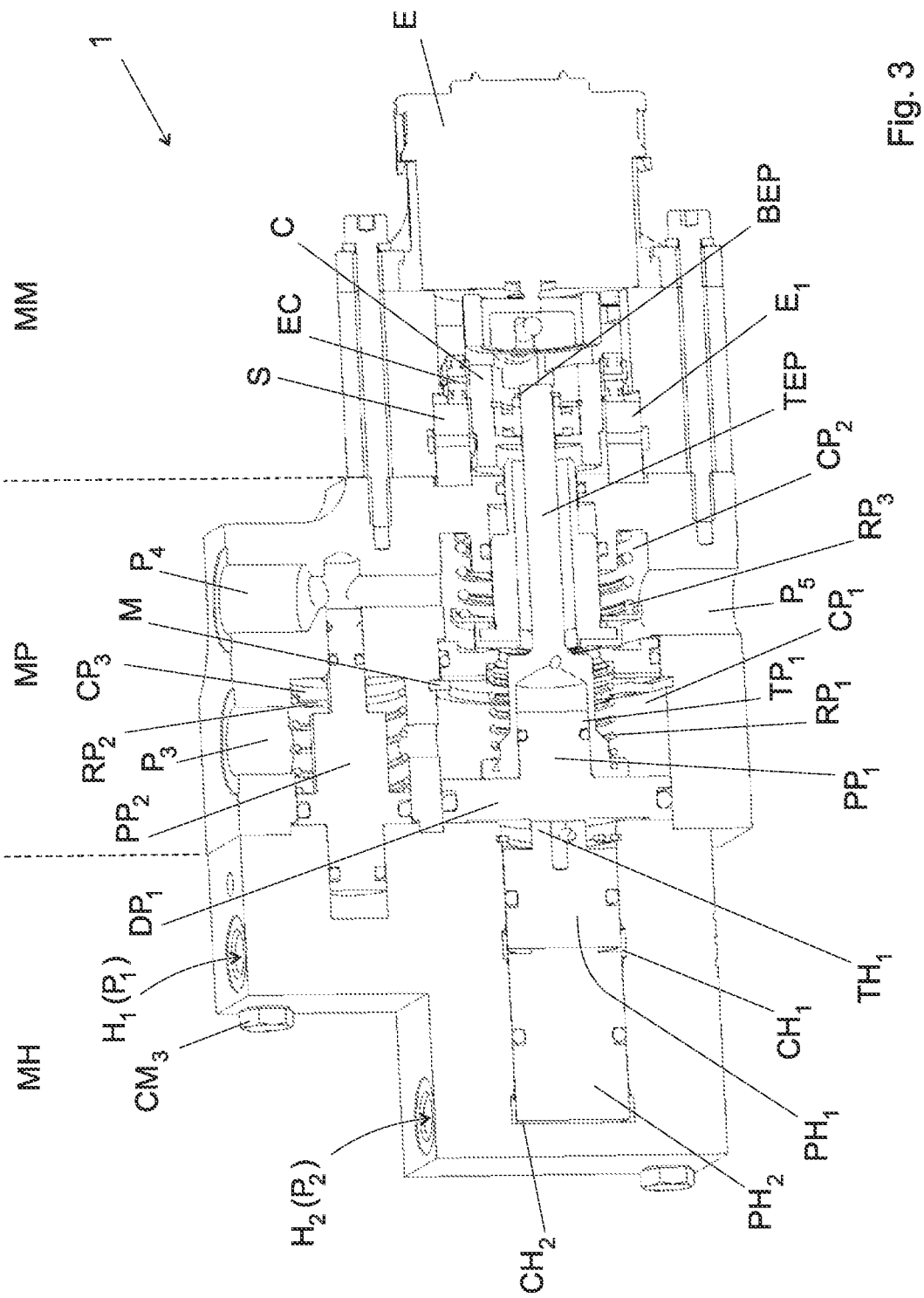

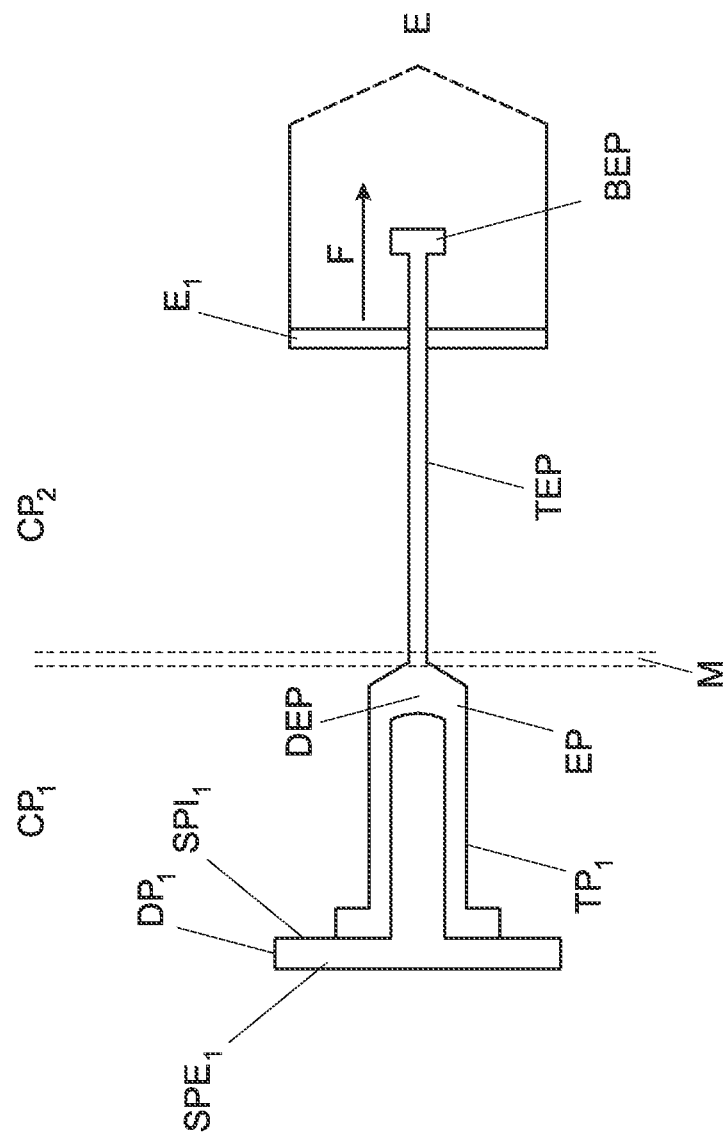

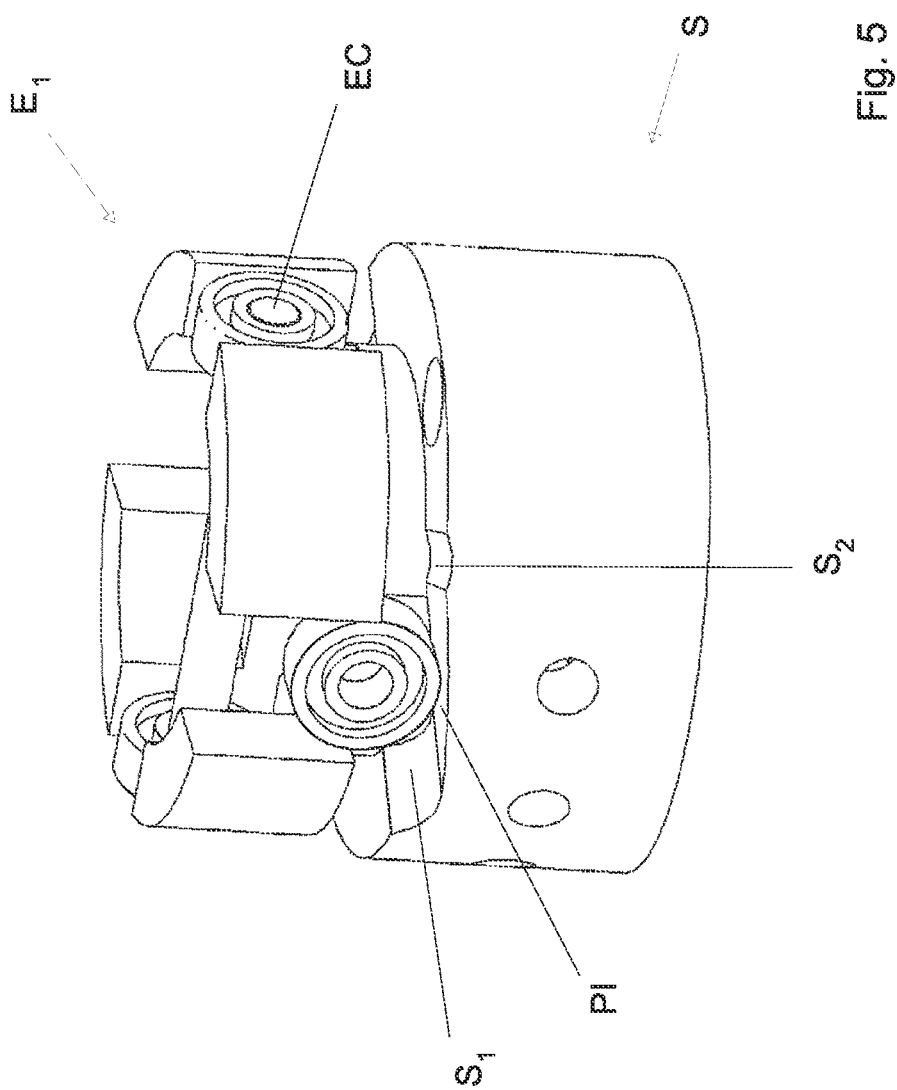

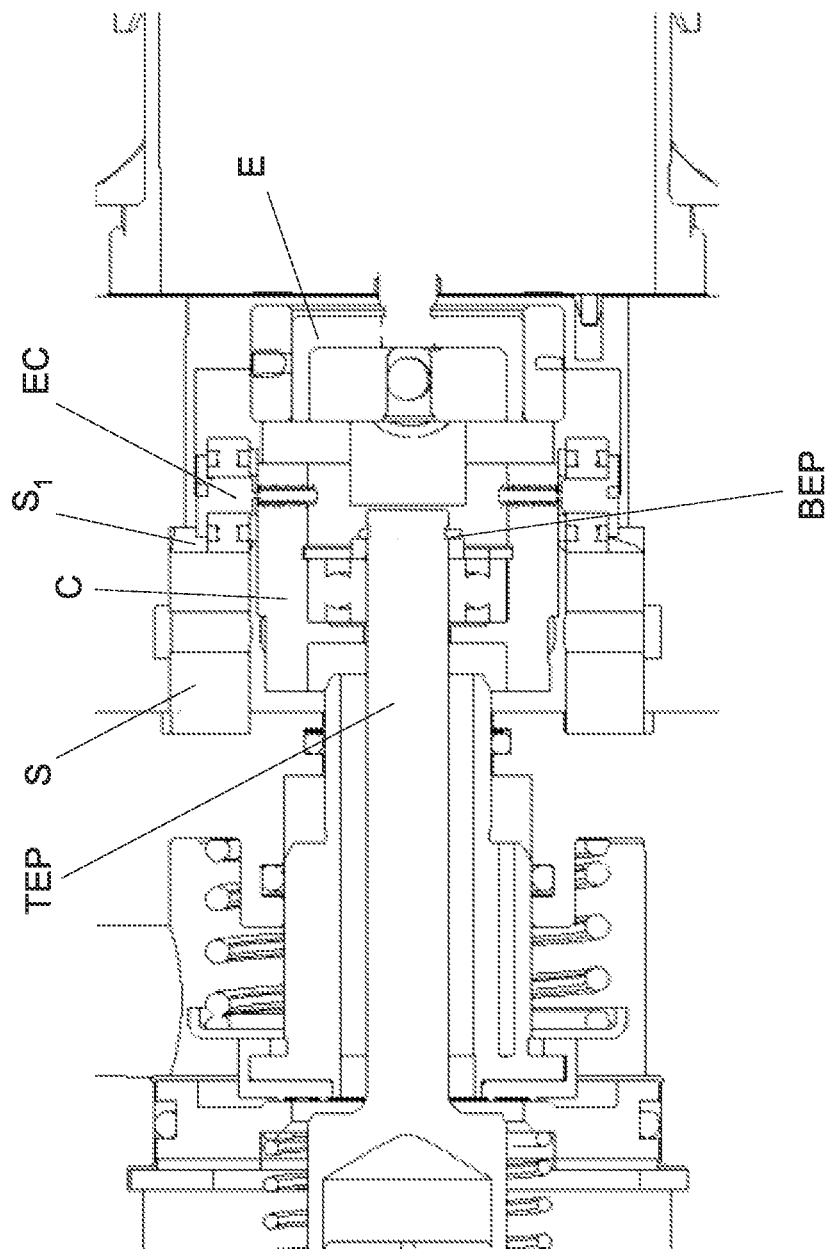

HYDROPNEUMATIC VALVE HAVING A MECHATRONIC MODULE

RELATED APPLICATIONS

This application is a national phase of PCT/IB2020/051860, filed on Mar. 4, 2020, which claims the benefit of Swiss Patent Application 00277/19, filed on Mar. 7, 2019. The entire disclosures of which are hereby incorporated by reference.

TECHNICAL FIELD

The present invention relates to a hydropneumatic valve including, in addition to the hydraulic and pneumatic modules, a mechatronic module, comprising an electromechanical module and an electronic management module. The pneumatic module can then be activated via the hydraulic module or the mechatronic module. This arrangement is particularly suitable for agricultural vehicles such as tractors, which have hydraulic braking. Other vehicles such as works or lifting vehicles, of the Fenwick type, or any other type of vehicle having a hydraulic braking system, and that can be combined with a trailer having pneumatic braking, can advantageously be provided with the valve of the present invention.

PRIOR ART

Agricultural vehicles, such as tractors, are generally provided with a hydraulic braking system. The wheeled elements capable of being hitched to agricultural vehicles can be braked via a pneumatic system. Hydropneumatic valves exist in order to transmit the braking commands from the lead vehicle to the hitched vehicles. Some are even controlled via an electric element.

EP2165901 describes for example such a hydropneumatic valve in which a set of pneumatic lines can be controlled by an electric system, as a function of the activation of the brake pedal of the lead vehicle. The main aim is to speed up the response times of the hydropneumatic braking.

U.S. Pat No. 3,779,612 describes the electric activation of the pneumatic braking in response to the activation of the brake pedal of the tractor.

The arrangements described thus far require connection operations that are sometimes long and complex. Specific compressed air lines must be provided in this case, which increases the risk of leaks.

In addition, agricultural vehicles can be provided with a non-stage transmission. This is particularly the case for electric or hybrid vehicles, or vehicles provided with a fully or partially hydrostatic transmission. The braking of such vehicles does not necessarily require the activation of the brake pedal. Hydraulic pressure control systems, with or without electrical assistance, based on the activation of the brake pedal, can then be found to be ineffective.

The present invention proposes a hydropneumatic valve that is free from the limitations mentioned above.

Another aim of the invention is to overcome the hysteresis phenomena specific to mechanical systems involving transfers of compressed fluids.

According to the invention, these aims are achieved particularly by means of a hydropneumatic valve that can be activated electrically, independently of the actuation of the brake pedal of the lead vehicle. The activation of the hydropneumatic valve is advantageously proportional to the slowing of the lead vehicle.

This solution further has the advantage of proposing a compact hydropneumatic valve that is easy to incorporate into existing braking systems. The hydropneumatic valve according to the present invention particularly does not require any modification of the fluid lines relating to either the hydraulic system or the pneumatic system.

BRIEF SUMMARY OF THE INVENTION

The invention relates to a hydropneumatic valve suitable for being provided on vehicles having both a hydraulic braking system and a pneumatic braking system. The term "vehicle" is used in the broad sense and includes vehicle combinations made up of a towing lead vehicle and one or more towed vehicles. The invention relates more particularly to a hydropneumatic valve comprising a hydraulic module, a pneumatic module and a mechatronic module. The mechatronic module includes an electromechanical module and an electronic management module.

The vehicles concerned are not limited to agricultural or forestry vehicles, but also include any work, road or handling vehicle that includes a hydraulic or electric braking system and is capable of being coupled to one or more trailers provided with an autonomous pneumatic braking system. The towing vehicle can be a remotely operated vehicle.

The pneumatic module of the valve comprises a low-pressure first pneumatic chamber. The term "low pressure" is given to mean insufficient pressure to activate the pneumatic braking of the vehicle. A low pressure can for example be atmospheric pressure. A low pressure can also be an intermediate pressure between atmospheric pressure and the pressure necessary to activate the pneumatic brakes. The pneumatic module of the hydropneumatic valve includes a high--pressure second pneumatic chamber. The term "high pressure" denotes an operating pressure capable of activating the pneumatic brakes of the vehicle. A high pressure can for example have a value of 8 bar, or 12 bar, or more depending on the type of vehicle. The second pneumatic chamber is supplied by a compressed air circuit particularly comprising a compressor and a compressed air reservoir. Other high pressure values can of course be considered, provided that they constitute an operating pressure. The two pneumatic chambers are separated from each other by a membrane preventing the compressed air from passing from the high-pressure second pneumatic chamber to the low-pressure first pneumatic chamber. The membrane can deform or move under the influence of a pushing element, so as to let the compressed air through from the second pneumatic chamber to the first pneumatic chamber, which makes it possible to activate the braking. Alternatively, the two pneumatic chambers can be separated from each other by a check valve, which can switch from the closed position to open under the influence of the pushing element.

The hydropneumatic valve of the present invention further includes a mechatronic module. The mechatronic module comprises an electromechanical module, including an electric motor and an element for activating the pushing element. According to a preferred aspect of the invention, the pushing element can be activated independently by the hydraulic module and by the mechatronic module. To this end, the pushing element can for example include a rod positioned so as to pass through the second pneumatic chamber, and comprising at its end holding means that can be gripped by an element of the mechatronic module. The pushing element is thus able to act on a membrane or a check valve in order to activate the braking, independently of the activation of the hydraulic module.

According to a particular aspect of the present invention, the holding means can include a stop positioned at the end of the rod of the pushing element, so that an activation element of the mechatronic module can grip it. The activation element can then take the form of a ring or a cylinder surrounding the rod of the pushing element and able to slide along the rod until it reaches the holding means of the rod. The movement of the activation element is caused by the electric motor of the electromechanical module.

According to a preferred aspect of the invention, the holding means include a circular stop positioned at the end of the rod of the pushing element. The activation element of the electromechanical module contains a ring or a rotating cylinder provided with at least one contact element, such as a rolling bearing, and a support positioned around the pushing element, one of the two faces of which includes at least one variation in relief acting as a cam, such as an inclined plane connecting two different surface levels. The contact element or contact elements of the rotating cylinder are in contact with the surface of the support including the two surface levels. The rotation of the rotating cylinder around the rod of the pushing element causes the contact elements to pass from one surface of the support to the other, thus generating a force for translating the pushing element.

According to one embodiment, the electronic management module of the mechatronic module includes a data processing unit that can receive and process various data originating from one or more sources. In particular, data relating to the driving of the vehicle or the behavior of the vehicle and collected by sensors, such as pressure sensors or position sensors, can be transmitted to the electronic management module, which will be able to process them and control the electromechanical module as a function of the result of such processing.

According to a particular embodiment of the invention, the electromechanical and electronic management modules are able to be activated automatically in the absence of activation of the hydraulic module, particularly due to the information provided by the sensors positioned on board the vehicle. In other words, the mechatronic module is thus activated independently without the hydraulic braking system of the lead vehicle being engaged.

Alternatively or additionally, the mechatronic module is able to be activated concomitantly with the activation of the hydraulic module. In this case, the activation of the mechatronic module can be limited to a shorter period than the activation of the braking operation. For example, a brief activation of the mechatronic module at the start of the braking operation can be envisaged. Such an arrangement makes it possible to increase the response speed of the braking system. It also makes it possible to contain or eliminate the natural hysteresis of the hydropneumatic valve and of the braking system as a function of the information transmitted by the sensors or by the brake controls or by both.

The present invention also relates to a vehicle provided with a hydropneumatic valve as described herein. Such a vehicle can be provided with various on-board sensors and communication lines connecting these sensors to the hydropneumatic valve. For example, a communication line includes but is not limited to a CAN bus. Other wired or wireless communication systems can be considered. The hydropneumatic valve can also be fitted to existing systems so that it is easy to incorporate into vehicles after the design thereof.

The present invention also relates to a braking device comprising the hydropneumatic valve described herein, as well as a hydraulic braking system suitable for activating the hydraulic module, a pneumatic braking system connected to the pneumatic module of the valve, and one or more sensors connected to the electronic module of the valve.

BRIEF DESCRIPTION OF THE FIGURES

Exemplary embodiments of the invention are set out in the description, which is illustrated by the attached figures, in which:

FIG. 3 is a longitudinal cross-sectional view of the hydropneumatic valve according to one embodiment FIG. 4 is a schematic view of the pushing element EP according to one embodiment FIG. 5 is a detailed view of the activation element comprising the rotating cylinder C and the support S FIG. 6 is a cross-sectional view of the activation element and the rod of the pushing element

EXEMPLARY EMBODIMENT(S) OF THE INVENTION

Figure 1:
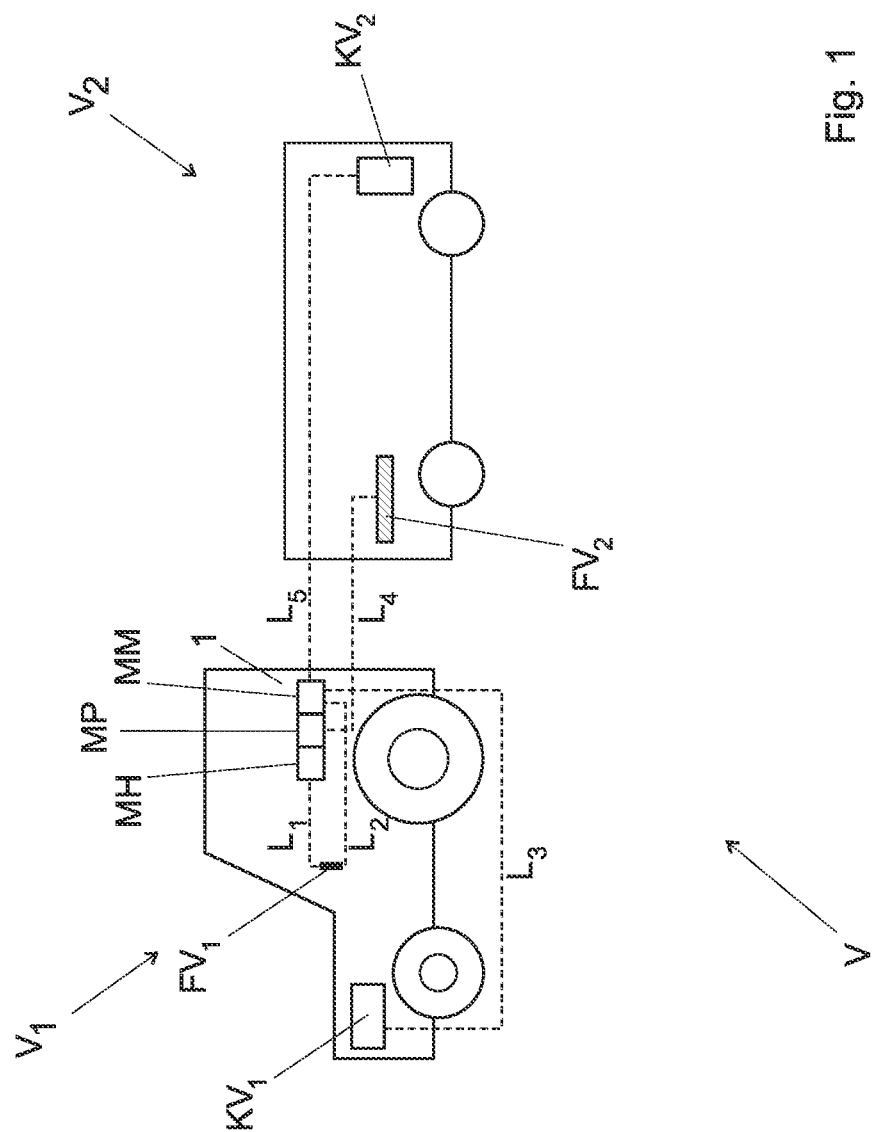
FIG. 1 is a schematic view of a vehicle combination
Figure 2:
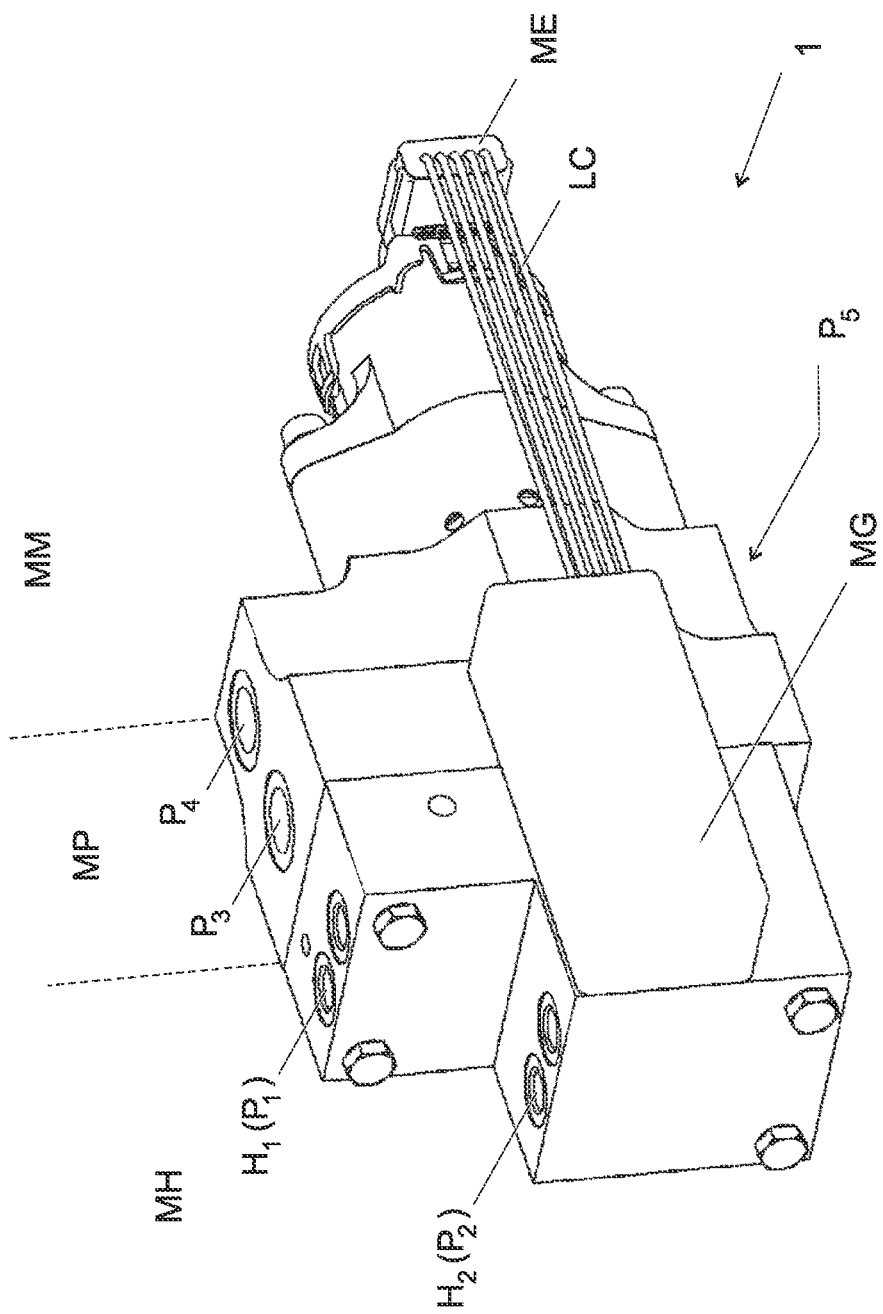
FIG. 2 is a perspective view of the hydropneumatic valve according to one embodiment

The invention preferably applies to a vehicle combination V, comprising a first vehicle V1 and at least a second vehicle V2, towed by the first vehicle V1. The first vehicle V1 has a hydraulic brake system FV1 that can be activated by activation means PV1 such as a brake pedal. The second vehicle V2 has an autonomous pneumatic braking system FV2. The second vehicle can particularly be a trailer, comprising a compressed air reservoir and all of the fluid connections necessary for its pneumatic braking. The pneumatic braking system of the second vehicle V2 is connected to the hydraulic braking system of the first vehicle V1 by means of a hydropneumatic valve 1. The hydropneumatic valve 1 is positioned on the lead vehicle V1.

The first vehicle can be provided with sensors KV1, particularly making it possible to determine one or more parameters such as the speed, changes in speed, the gradient of the land, the activation of the brake or acceleration controls, or other parameters linked to the behavior of the vehicle combination V or the driver. The second vehicle V2 can be provided with one or more sensors KV2, particularly making it possible to determine parameters such as its speed or changes in speed.

The hydropneumatic valve 1 according to the invention includes a hydraulic module MH, a pneumatic module MP and a mechatronic module MM. The pneumatic module MP is positioned between the hydraulic module MH and the mechatronic module MM. The axes of the different modules can be coaxial or otherwise. For example, the hydraulic module MH can be positioned parallel to the pneumatic and mechatronic modules. The hydraulic module MH is in fluid communication with the hydraulic brake system FV1 of the first vehicle VI particularly by means of one or more lines L1, suitable for transferring hydraulic fluids. The pneumatic module MP is in fluid communication with the autonomous brake system of the second vehicle V2, particularly by means of one or more lines L4 suitable for transferring compressed air.

The mechatronic module MM comprises an electromechanical module ME, comprising an electric motor E and an activation element E1 suitable for initiating the movements of the pushing element EP. The mechatronic module further comprises a management module MG, suitable for receiving information, processing the information and transmitting control information to the electromechanical module ME and to the second pneumatic piston PP2 if this is replaced by an electropneumatic valve. The management module MG can be incorporated into or associated with the mechatronic module MM. When it is associated therewith, one or more communication and supply lines LC is/are provided between the management module MG and the electromechanical module ME.

The hydraulic module MH includes a first supply line H1, connected to the line L1 and conveying the pressurized oil P1 to a first hydraulic chamber CH1 delimited by a first hydraulic piston PH1. The first hydraulic piston PH1 is in contact with the pneumatic module MP. In this case, the rod TH1 of the first hydraulic piston PH1 is supported on the head DP1 of a first pneumatic piston PP1, of the pneumatic module MP. As a result, the arrival of pressurized oil P1 through the first supply line H1 causes the movement of the first pneumatic piston PP1.

The first pneumatic piston PP1 includes a head DP1 and a rod TP1, the outer surface SPE1 of the head of the first pneumatic piston PP1 is in contact with the rod TH1 of the first hydraulic piston and receives the thrust from the first hydraulic piston PH1 when the hydraulic braking system of the tractor is activated. The rod TP1 of the first pneumatic piston PP1 is guided in the head DEP of a pushing element EP, so that it can slide freely therein. The pushing element EP comprises, in addition to its head DEP, a rod TEP that ends in a holding element such as a stop BEP. The head of the pushing element EP is in contact with a membrane M separating a first pneumatic chamber CP1 from a second pneumatic chamber CP2. The first pneumatic chamber CP1 is at low pressure, particularly at atmospheric pressure, whereas the second pneumatic chamber CP2 is at a pneumatic pressure greater than the pressure in the first pneumatic chamber CP1. The second pneumatic chamber CP2 is in particular connected to the autonomous brake system of the trailer FV2, and supplied with compressed air. The pressure in the second pneumatic chamber CP2 can for example be of the order of 8 bar, 12 bar, or 20 bar, the compressed air being supplied by the compressed air system of the vehicle. Other pressures can of course be considered.

When the first pneumatic piston PP1 is activated by the first hydraulic piston PH1, it causes the movement of the head DEP of the pushing element EP, which in turn moves the membrane M. The movement of the membrane M causes the transfer of pressurized air from the second pneumatic chamber CP2 to the first pneumatic chamber CP1, and the activation of the pneumatic braking.

The air at the pressure P3 caused in the first pneumatic chamber CP1 exerts pressure on the inner surface SPI1 of the head DP1 of the first pneumatic piston PP1, which equalizes with the pressure P1 exerted by the first hydraulic piston PH1. The intensity of the pneumatic braking then depends on the oil pressure P1 caused in the hydraulic module MH.

The return spring RP1 associated with the first pneumatic piston PP1 returns the first hydraulic piston PH1 and the first pneumatic piston PP1 to their initial position when the oil pressure P1 decreases, particularly following the release of the brake pedal of the tractor.

According to one possible embodiment, the hydraulic module MH includes a second hydraulic piston PH2, coaxial with the first hydraulic piston PH1, and a second hydraulic supply H2, connected to the set of lines L1, which supplies a second hydraulic chamber CH2 at a pressure P2, the second hydraulic chamber CH2 being delimited by the second hydraulic piston PH2. The activation of the brake pedal of the tractor makes it possible to supply the two lines H1 and H2 of the hydraulic module MH, which causes the simultaneous movement of the two hydraulic pistons PH1 and PH2. If one of the two hydraulic lines H1 and H2 is not supplied or is under-supplied, during a fault for example, the hydraulic pressure of the operational line is sufficient to move at least the first hydraulic piston PH1 and activate the pneumatic module MP, via the movement of the first pneumatic piston PP1. The number of control lines and hydraulic pistons can be greater than two, as required. In particular, a third hydraulic piston can be provided (not shown), coaxial with the other two hydraulic pistons PH1 and PH2, and supplied with oil by an emergency brake control of the lead vehicle V1. The pneumatic braking activated in this way can respond proportionally to the intensity of the emergency braking activated on the lead vehicle V1 by the driver.

The hydraulic module MH described herein is a non-limiting example. Other designs of the hydraulic module MH can be envisaged, particularly those including just one piston.

The pushing element EP is thus activated by the hydraulic module MH when the hydraulic system FV1 of the tractor is activated, by action on the brake pedal or any other member for activating the hydraulic braking.

Optionally, the pneumatic module MP can be provided with a second pneumatic piston PP2, suitable for overcoming any failure of the pneumatic control connection P3 of the braking system of the towed vehicle V2. This can be the case, for example, when the pneumatic control connection is pulled out or punctured. The second pneumatic piston PP2 is usually activated by the hydraulic module MH via a third hydraulic chamber CH3, supplied by the supply line H1, According to an advantageous aspect of the present invention, the second pneumatic piston PP2 can alternatively or additionally be activated via the mechatronic module MM, by means for example of an electropneumatic valve (not shown). The activation of the second pneumatic piston PP2 can take place via the mechatronic module MM particularly following the detection of a loss of pressure in the pneumatic control line P3. The movement of the second pneumatic piston PP2 causes the closure of the compressed air supply P4 originating from the towing vehicle V1. Concomitantly, the mechatronic module MM actuates the pushing element EP so as to obtain the maximum air flow between the high-pressure second pneumatic chamber CP2 and the low-pressure first pneumatic chamber CP1, rapidly purging the compressed air reservoir of the towed vehicle V2, from the line P5 to the line P3. The sudden drop in pressure makes it possible to activate the emergency braking of the towed vehicle V2 if necessary. The pushing element EP can be activated independently via the hydraulic piston PH1, when the hydraulic module is activated. The mechatronic module MM thus makes it possible to activate the emergency braking independently of the hydraulic module MH or concomitantly therewith. Alternatively, the third hydraulic chamber CH3 and the second pneumatic piston PP2 can be replaced by an electropneumatic valve.

Preferably, when the brake pedal of the tractor is actuated, the hydraulic module MH makes it possible to activate the first PP1 and second PP2 pneumatic pistons simultaneously. A configuration of a pneumatic module MP that does not include a second pneumatic piston PP2 can also be envisaged within the scope of the present invention.

According to the present invention, the pushing element EP can be activated by the mechatronic module MM independently of the hydraulic module MH. The rod of the pushing element TEP passes through the second pneumatic chamber CP2 and extends towards the electromechanical module ME. It ends in holding means that allow it to be gripped by an activation device E1.

According to one embodiment, the holding means take the form of a stop BEP on which an activation device E1, independent of the rod TEP of the pushing element EP, can exert a pulling force F. Such a stop BEP, situated at or near the end of the rod TEP of the pushing element EP, can for example be circular and have a larger diameter than the rod TEP of the pushing element EP. Alternatively, it can take the form of a circular groove near the end of the rod TEP of the pushing element EP, into which a boss or a jaw can be inserted and thus exert a pulling force F. Other arrangements can be envisaged, provided that the rod TEP of the pushing element EP remains free to move relative to the activation device E1 when the activation device E1 is not being operated.

The activation device E1 includes a movable element, independent of the rod TEP of the pushing element EP, that can be actuated so as to interact with the holding means of the rod TEP of the pushing element EP. Such a movable element can for example be a ring or a cylinder C positioned around the rod TEP of the pushing element EP and free to slide along this rod, so as to come into contact with the means for pulling the rod TEP. The movable element can alternatively be a system of jaws that can engage with the holding means of the rod TEP of the pushing element EP. The activation device E1 is actuated by an electric motor E, preferably suitable for exerting a significant force in a small range of movement.

According to a preferred aspect of the invention, the holding means include a circular stop BEP positioned at the end of the rod TEP of the pushing element EP. The activation element E1 of the electromechanical module ME includes a ring or a rotating cylinder C surrounding the rod TEP of the pushing element EP, the rod TEP of the pushing element EP remaining free relative to the activation element E1. The cylinder C of the activation element E1 is provided with at least one contact element EC, such as a rolling bearing or a pair of rolling bearings, suitable for remaining in contact with the surface of a fixed support S. The surface of the fixed support S that is in contact with the contact element EC of the rotating cylinder C includes at least one variation in relief acting as a cam, such as an inclined plane P1 connecting two different surface levels S1 and S2. The inner part of the rotating cylinder C includes a surface that can come into contact with stop BEP of the pushing element EP. The rotation of the cylinder C of the activation element E1 around the rod TEP of the pushing element EP causes the contact elements EC to pass from one of the surfaces S1 to the other surface S2 of the fixed support S, via the inclined plane P1. The rotating cylinder C then moves closer to the stop BEP and can exert a force F on it that allows the translation of the pushing element EP. The fixed support S can for example take the form of a ring or a cylinder fixed inside the mechatronic module MM and surrounding the rod TEP of the pushing element EP.

Other embodiments can be envisaged regarding the activation of the pushing element EP. For example, a screw and nut assembly that makes it possible to cause a linear movement of the pushing element EP is envisaged. According to such an arrangement, the end of the pushing element EP can be provided with a nut or any annular part provided with a thread on its inner circumference. The mechatronic module MM can comprise a threaded shaft that can be inserted into the threaded annular part rigidly connected to the pushing element EP and thus produce a linear movement when it is rotated. The reverse arrangement, in which the pushing element EP is provided with a threaded shaft and the mechatronic module MM comprises a threaded annular part, is also envisaged. Alternatively, an electromagnet can be used to activate the pushing element EP.

The pushing element EP is free to move under the activation of the hydraulic module MH, as the electromechanical module ME leaves sufficient clearance for the movement of the rod TEP of the pushing element EP.

When the activation of the pneumatic braking is deemed necessary but the brake pedal of the lead vehicle V1 has not been actuated, in other words, the hydraulic module MH has not been engaged, the electric motor E actuates the activation device E1 in the direction of pulling the pushing element EP. The head DEP of the pushing element EP pushes the membrane M, which then allows the transfer of compressed air from the second pneumatic chamber CP2 to the first pneumatic chamber CP1, thus activating the pneumatic braking system of the trailer.

According to a preferred embodiment, the head DEP of the pushing element EP is free to move relative to the first pneumatic piston PP1. As a result, the head DP1 of the first pneumatic piston PP1 remains in contact with the hydraulic module MH, when the pneumatic braking is activated by the electromechanical module ME. The return spring RP1 returns the pushing element EP to its initial position when the pulling force F disappears or decreases, in other words when the electric motor E ceases to be engaged.

According to another aspect of the present invention, the pneumatic braking is activated independently by the hydraulic module MH and the mechatronic module MM. In other words, only one or the other of the hydraulic MH and mechatronic MM modules acts on the pushing element EP. The pneumatic braking of the trailer can thus be activated solely via the hydraulic module MH, when the brake pedal of the tractor or any other means of actuating the hydraulic module MH is actuated. Other means of actuating the hydraulic module MH can include for example a manual lever, or any other means of action accessible to the driver of the lead vehicle V1. According to this configuration, the pneumatic braking can be actuated via the mechatronic module MM when, for example, the lead vehicle V1 decelerates without activation of the hydraulic module MH. Deceleration can be determined using a sensor or a set of specific sensors KV1 positioned on the vehicle V, or by means of a computer already present on the vehicle V and making it possible for example to determine the speed differential coefficient. Deceleration can alternatively be determined according to the driver's behavior, on the release of the accelerator pedal, for example. To this end, an accelerator pedal position sensor can make it possible to determine a change in position capable of causing a slowing of the lead vehicle V1. Alternatively, the gradient of the ground can be measured using a specific sensor and determine a potential slope, that might require the activation of the trailer braking. The need to activate the trailer braking, together with the metering of its intensity, can be determined on the basis of a combination of measurements and readings by different sensors and according to different parameters, comprising for example the load of the vehicle or its center of gravity. Sensors KV2 can for example be positioned on the trailer.

If the pneumatic trailer braking is deemed necessary, the corresponding information is transmitted to the mechatronic module via one or more transmission lines L3, L5. The information can be transmitted via the electrical system installed on the vehicle. The information can for example pass via the CAN bus, or via other wired elements available. It can also be transmitted by wireless means such as Bluetooth, Wi-Fi or other communication protocols available.

The electric motor E is then activated automatically, at an intensity and for a period corresponding to the trailer braking requirements.

The electric motor E acts directly on the pushing element EP with delays that are often shorter than during a pressure transfer from the hydraulic module MH to the pneumatic module MP. Such an arrangement is therefore often suitable for emergencies.

According to another operating mode of the invention, the electric motor E can be activated concomitantly with the hydraulic module MH. In this case, the mechatronic module MM can be connected to the hydraulic brake system of the lead vehicle V1. The mechatronic module MM can be connected to the hydraulic system via the brake pedal of the tractor or any other element usually suitable for activating the hydraulic module MH, or any sensor included in the hydraulic system, such as hydraulic pressure sensors. The mechatronic module MM can particularly be connected to the hydraulic brake system via a connection L2. Such an arrangement makes it possible in particular to overcome the drawbacks linked to fluid dynamics. During emergency braking, the electric motor E can be more responsive than the hydraulic module MH/pneumatic module MP fluid pair. The first instants of braking can then be exerted via the electric motor E, before the oil and compressed air pressures of the hydraulic MH and pneumatic MP modules are fully effective. At the start of braking, the mechatronic module MM is able to recognize, by means of the various sensors, even a very slight need to brake the towed vehicle V2, and controls the opening of the valve 1 by means of the electromechanical module ME so as to compensate for the internal friction of the hydraulic MH and pneumatic MP modules and the internal friction of the braking system of the towed vehicle V2.

The connection L2 does not rule out the connection of the mechatronic module MM with the connection L3 and with any sensors KV1, KV2 on the vehicle, or its automatic activation independently of the activation of the hydraulic module MH as described above.

According to a particular arrangement, the electric motor E can be activated only temporarily during a braking phase. It can for example be activated at the time of the engagement of the hydraulic braking by pressing on the brake pedal, or any other element for activating the hydraulic braking, then stopped in the rest of the braking operation. Such an arrangement makes it possible to counterbalance the natural hysteresis of the hydropneumatic system while limiting the combined loads on the electric motor E and the hydraulic module MH.

According to a particular arrangement, the mechatronic module MM can comprise a parking brake function of the towed vehicle V2. When it is activated to this end from the lead vehicle V1, the activation element E1 places the pushing element EP in a stable position that makes it possible to retain maximum pressure in the first pneumatic chamber CP1, for an indeterminate time and without consuming electricity. According to one embodiment of the invention, the parking brake function can be implemented by means of a third surface S3 positioned on the surface of the support S in contact with the contact elements EC of the activation element E1. This third surface S3 then makes it possible to clamp the contact element or contact elements EC of the activation element E1 in an extreme locking position of the pneumatic brakes. In particular, the third surface S3 can simply consist of a slot capable of receiving the contact element(s) EC.

According to an optional arrangement, the electronic management module MG is further capable of performing diagnostic tests at regular intervals, or during predetermined periods. A predetermined period can for example be the starting of the vehicle V, or the moment of coupling of the first V1 and second V2 vehicles. The term "regular intervals" is given to mean a predetermined operating time, or a predetermined mileage. Some parameters can be measured and checked permanently by the management module MG. The diagnostic tests performed in this way comprise in particular consistency tests on the information transmitted by the sensors KV1, KV2 of the vehicle V, with or without activation of the brake controls. The diagnostic tests can additionally or alternatively compare the information transmitted by the various sensors and the information relating to the braking set points, thus making it possible to detect any malfunction of the device. The information relating to the malfunction is transferred to the lead vehicle V1 via the communication system of the vehicle V by the diagnostic function incorporated into the electronic management module MG.

The mechatronic module MM can comprise, in addition to the activation device E1 and the electric motor E, as required, a unit for processing the data received by the sensors KV1, KV2 of the vehicle V. It can also be connected to a separate battery connected to the generator of the tractor. The mechatronic module can also be connected to one or more alarm systems, particularly if it is engaged automatically in response to the data gathered by the sensors KV1, KV2. Such an alarm can be limited to illuminated and/or audible signals in the driver's compartment. Alternatively or additionally, a radio signal can be transmitted to a control station or to a telephone platform or to one or more connected devices.

According to a particular arrangement, the hydropneumatic valve according to the present invention can offer a proportional emergency brake. When a specific control of the lead vehicle V1 is actuated, the mechatronic module MM is then able to actuate the pneumatic braking system as set out above. The degree of rotation of the cylinder C can be controlled so as to meter the intensity of the pneumatic braking. In the situation mentioned above in which a third hydraulic control can be actuated from the lead vehicle V1, such as a manual emergency lever, the mechatronic module MM can be activated proportionally concomitantly with the hydraulic module MH.

According to a particular arrangement, the hydropneumatic valve according to the present invention can be used without the hydraulic module MH.

REFERENCE NUMBERS USED IN THE FIGURES

C Rotating cylinder
MH Hydraulic module
MP Pneumatic module
ME Electromechanical module
MG Electronic management module
MM Mechatronic module
H1; P1 First hydraulic line, at pressure P1

H2; P2 Second hydraulic line, at pressure P2
PH1 First hydraulic piston
P3 Braking control line of the towed vehicle V2
P4 Compressed air supply line of the braking system
P5 Compressed air supply line of the second vehicle V2
PI inclined plane of the stop
PH2 Second hydraulic piston
DP1 Head of the first pneumatic piston
PP1 First pneumatic piston
PP2 Second pneumatic piston
RH Hydraulic return spring
RP1 First pneumatic return spring
RP2 Second pneumatic return spring
RP3 Third pneumatic return spring
E Electric motor
E1 Activation element
EC Contact element of the activation element El
T1 Pulling rod
E1 Activation device
CH1 First hydraulic chamber
CH2 Second hydraulic chamber
CH3 Third hydraulic chamber
TH1 Rod of the first hydraulic piston
S Fixed support
S1, S2, S3 First, second and third surfaces of the support S
SPE1 Outer surface of the first pneumatic piston
SPI1 Inner surface of the first pneumatic piston
TP1 Rod of the first pneumatic piston
DEP Head of the pushing element
EP Pushing element
TEP Rod of the pushing element
BEP Stop of the pushing element
CH3 Third hydraulic chamber
KV1, KV2 Sensors
V, V1, V2 Vehicles
L1, L2, L3, L4, LS Connection lines
FV1 Braking system of the first vehicle
FV2 Braking system of the second vehicle
PV1 Hydraulic brake pedal

The invention claimed is:

1. A hydropneumatic valve comprising a hydraulic module (MH) and a pneumatic module (MP), the pneumatic module comprising:
   a low-pressure first pneumatic chamber (CP1), comprising a first pneumatic piston (PP1), and a high-pressure second pneumatic chamber (CP2), the two pneumatic chambers being separated from each other by a membrane (M),
   a pushing element (EP) adapted to act on the membrane (M) so as to let the high-pressure compressed air pass from the second pneumatic chamber (CP2) to the first pneumatic chamber (CP1),
   wherein the hydropneumatic valve further includes a mechatronic module (MM), comprising an electronic management module (MG), and an electromechanical module (ME), said electromechanical module comprising an electric motor (E) and an activation element (E1), and the pushing element (EP) is independently activatable by the hydraulic module (MH) and the electromechanical module (ME).

2. The hydropneumatic valve as claimed in claim 1, characterized in that the pushing element (EP) includes a rod (TEP) and a head (DEP), the head (DEP) being positioned in the first pneumatic chamber (CP1), the rod (TEP) being positioned across the second pneumatic chamber (CP2), and holding means adapted to be gripped by the activation element (E1) of the mechatronic module (MM).

3. The hydropneumatic valve as claimed in claim 2, wherein the holding means include a stop (BEP) positioned at the end of the rod (TEP) of the pushing element (EP), and the activation element (E1) includes a ring or a cylinder (C) movable around the rod (TEP) of the pushing element (EP) and actuatable by the electric motor (E).

4. The hydropneumatic valve as claimed in claim 3, wherein the activation element (E1) further includes a support S, a surface of which includes at least two separate levels (S1) and (S2) connected by an inclined plane (PI) acting as a cam, and the activation element (E1) includes at least one contact element (EC), in contact with the surfaces (S1) and (S2) of the support (S) wherein a longitudinal movement of the pushing element (EP) is initiated when the activation element (E1) is rotated by the electric motor (E).

5. The hydropneumatic valve as claimed in claim 1, wherein the mechatronic module (MM) is connected to one or more sensors (KV1), (KV2) and said mechatronic module is automatically activated in the absence of activation of the hydraulic module (MH).

6. The hydropneumatic valve as claimed in claim 1, wherein the mechatronic module (MM) is activated concomitantly with the activation of the hydraulic module (MH).

7. The hydropneumatic valve as claimed in claim 1, wherein the pneumatic module (MP) includes a second pneumatic piston (PP2) activatable by an electropneumatic valve adapted to be engaged by the mechatronic module (MM).

8. The hydropneumatic valve as claimed in claim 1, wherein the mechatronic module (MM) is activated concomitantly with the activation of the hydraulic module (MH) at the start of the braking operation, then deactivated.

9. The hydropneumatic valve as claimed in claim 1, wherein a degree of rotation of a rotating cylinder (C) of the activation element (E1) is controlled proportionately to a degree of activation of a control of a lead vehicle (V1).

10. A vehicle combination (V) comprising a first vehicle (V1) provided with a hydraulic braking system (FV1), and at least a second vehicle (V2) provided with a pneumatic braking system (FV2), wherein the hydraulic braking system (FV1) of the first vehicle (V1) and the pneumatic braking system of the second vehicle (FV2) are connected via the hydropneumatic valve as claimed in claim 1.

* * * * *